United States Patent
Horner, Jr. et al.

[11] Patent Number: 6,073,535
[45] Date of Patent: Jun. 13, 2000

[54] GUARD FOR A VALVE BODY OF A BRAKE BOOSTER

[75] Inventors: Charles Byron Horner, Jr.; Rolf Viebach, both of South Bend, Ind.

[73] Assignee: Robert Bosch Corporation, Broadview, Ill.

[21] Appl. No.: 09/130,651

[22] Filed: Aug. 7, 1998

[51] Int. Cl.[7] ............................. F15B 9/10; F15B 21/04
[52] U.S. Cl. ...................... 91/376 R; 92/78; 92/169.1
[58] Field of Search .......................... 91/376 R; 92/78, 92/169.1

[56] References Cited

U.S. PATENT DOCUMENTS

| | | | |
|---|---|---|---|
| 2,763,989 | 9/1956 | Ayers | 91/376 R |
| 4,567,728 | 2/1986 | Ohmi et al. | 92/169.1 |
| 4,966,420 | 10/1990 | Schiel et al. | 60/547.1 |
| 5,487,324 | 1/1996 | Gautier et al. | 91/376 R |

*Primary Examiner*—F. Daniel Lopez
*Attorney, Agent, or Firm*—Leo H. McCormick, Jr.; Warren Comstock

[57] ABSTRACT

A brake system has a brake booster secured to a dash panel which separates an engine compartment from a passenger compartment of a vehicle. A bracket off-sets the booster into the engine compartment from the dash panel. A cylindrical body has a flange on a first end located between the housing of the brake booster and the bracket. The cylindrical body has a partition wall located between the first end and a second end and a radial opening located between the partition wall and the second end. The partition wall has a central opening through which an input rod extends to provide a valve with an input force. An end boot, secured to the second end of the cylindrical body and the input rod, forms a resonant chamber within the cylindrical body. The radial opening provides unrestricted communication air from the engine compartment to the resonant chamber while the central opening forms an orifice to control the air flow from the resonant chamber into the valve body. The resonant chamber is of sufficient size to dissipate audible sounds produced by the flow of air through the orifice to the valve.

11 Claims, 1 Drawing Sheet

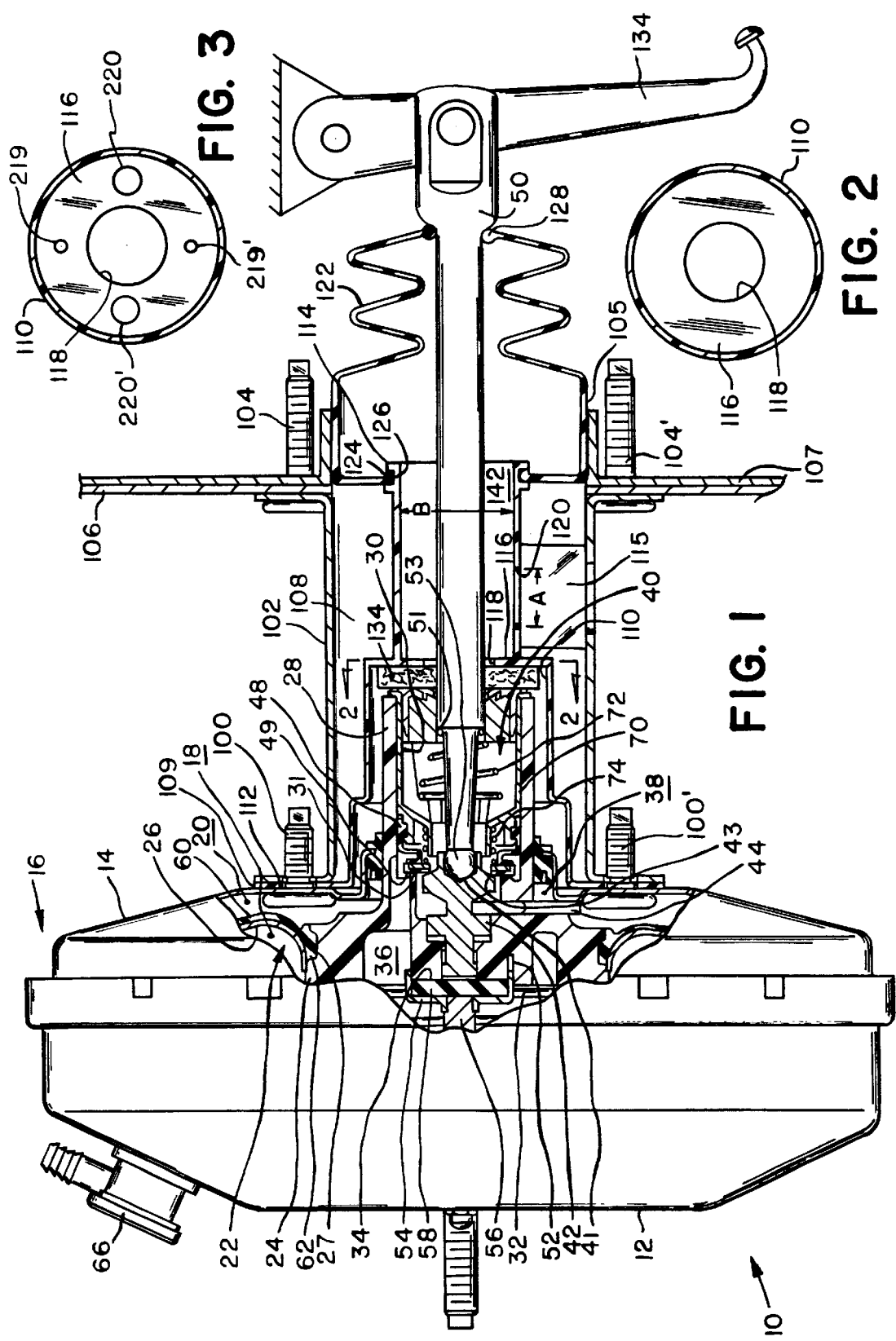

GUARD FOR A VALVE BODY OF A BRAKE BOOSTER

This invention relates to a guard for a valve body in a brake booster. The guard has a resonate chamber for attenuating noise caused by the flow of air through a valve to an actuation chamber where a pressure differential is created to develop an operational force during a brake application.

BACKGROUND OF THE INVENTION

In brake boosters, such as illustrated in U.S. Pat. No. 4,953,446, a pressure differential is created across a wall that separates a vacuum chamber from a control chamber. The pressure differential acts on the wall to develop an output force corresponding to an input force applied to a control valve. The control valve includes a return spring which urges a plunger toward an atmospheric seat on a poppet member and a seat spring to urge the poppet toward a vacuum seat. The input force is applied to the push rod which compresses the return spring to move the plunger and sequentially allow the seat spring to seat the poppet member on the vacuum seat and the plunger to move away from the poppet member to thereafter allow air to flow to the control chamber. The communication of air through the poppet can effect the uniform development of a pressure differential and as shown in U.S. Pat. No. 4,953,446 a contoured surface could be placed on the push rod to reduce the development of turbulence in the air that is supplied to the control chamber. To further reduce the turbulence in the flow of air and correspondingly noise during a brake application, guides as illustrated in U.S. Pat. No. 5,249,505 could be used for channeling air around a return spring in the valve. Other attempts at reducing noise caused by the flow of air are disclosed in U.S. Pat. No. 4,274,258 where a dust boot has a wall for directing the flow of air and U.S. Pat. No. 4,716,814 where a muffler structure modifies sounds within a valve body.

In analyzing the operation of brake boosters it was observed that air supplied to a control valve most often is obtained from the passenger compartment of a vehicle. If the sounds caused by the flow of air from the passenger compartment during the operation of a brake booster could be shifted from the passenger compartment to an engine compartment a passenger would not hear the booster operation. Unfortunately space in the engine compartment is limited and relocating the brake booster within the engine compartment of a vehicle still requires at least a portion of the components that are associated with a brake booster to remain in a passenger compartment of the vehicle.

In the present invention, a bracket positions a brake booster away from a dash panel and a valve body guard has a cylindrical body through which air from the engine compartment is presented to the valve during the development of an output force in the brake booster to effect a brake application. A resonant chamber within the cylindrical body attenuates noise developed during the flow of air within the brake booster and as a result noise present in the passenger compartment is virtually eliminated.

SUMMARY OF THE INVENTION

A primary object of the present invention is to provide a valve guard for a brake booster wherein noise caused by the flow of air to an operational chamber within a brake booster is attenuated by being dissipated in a resonant chamber.

According to this invention, a brake system has a booster with a housing secured to an offset bracket attached to dash panel which separates an engine compartment from a passenger compartment in a vehicle. The interior of the housing is divided by a movable wall into at least a first chamber and a second chamber. A valve body associated with the movable wall has a cylindrical projection which extends through the housing. A valve which is located in the valve body is connected to an input rod to selectively communicate air to the second chamber for creating a pressure differential across the movable wall with a vacuum in the first chamber in response of an input applied to the input rod. The pressure differential acts on the movable wall to develop a corresponding output force to effect a brake application. A guard located between the housing and bracket has a cylindrical body which extends into the passenger compartment. The interior of the cylindrical body is divided by a partition wall with a central opening therein. The cylindrical body has a radial opening located approximately mid-way between the partition wall and an end located in the passenger compartment. An end boot secured to the end of the cylindrical body and to the input rod forms a resonant chamber within the cylindrical body. On an input force being applied to the input rod, the valve is actuated to allow air to flow to the second chamber by way of the radial opening, resonant chamber and central opening in the partition wall. The central opening forms an orifice to control the flow air from the resonant chamber into the valve body. The size of the resonant chamber and location of the radial opening in the cylindrical body are such that audible sounds produced by the flow of air through the orifice are attenuated and not heard in the passenger compartment.

An advantage of a brake system using this invention resides in a communication of air from an engine compartment to a valve through a resonant chamber to dissipate noise caused by the flow of air through the valve to an operational chamber during a brake application.

A further advantage of this brake system of this invention is provided through the use of a cylindrical guard for a valve body wherein the entry of air to the valve body from an engine compartment occurs through a radial opening in the cylindrical guard located at a point located mid-way between a partition wall and a end boot and an orifice formed by a central opening in the partition wall, the space in the cylindrical guard between the partition wall and end boot defining a resonant chamber to attenuate sounds created by the flow of air from the surrounding environment to an operational valve located in the valve body.

BRIEF DESCRIPTION OF THE DRAWINGS

FIG. 1 is a schematic illustration of a brake system which includes a brake booster offset from a dash panel by a guide arrangement made according to the principals of the present invention;

FIG. 2 is a partial sectional view taken along lines 2—2 of FIG. 1; and

FIG. 3 is a sectional view of an alternate partition wall for use in the guide of FIG. 1.

DETAILED DESCRIPTION

The brake system 10 shown in FIG. 1 illustrates a typical single brake booster 10 of a type disclosed in U.S. Pat. No. 5,233,911 wherein a front shell 12 is joined to a rear shell 14 by a twist lock arrangement 16 to form a unitary structure. A wall 22 which includes a radial disc 26 and diaphragm 60 divides the interior of the unitary structure into a front chamber 18 and a rear chamber 20. The radial disc 26 has an integral central hub 24 and a cylindrical projection or valve body 28 that extends through the rear shell 14. The diaphragm 60 has a first bead 62 located in a groove 27 on the radial disc 26 and a second bead that is confined by the twist lock arrangement 16 to assure that the front 18 and rear 20 chambers are separated from each other and the surrounding environment. An axial bore 30 extend through the central hub 24 and cylindrical projection 28. The front of the central hub 24 has a face 32 with an annular groove 52 that surrounds a bearing surface 34. The bearing surface 34 extends inward into the axial bore 30. The central hub 24 has a first passageway 36 that extends from the front face 32 to an annular vacuum seat 31 in the axial bore 30 and a second passageway 38 that extends from the axial bore 30 through the cylindrical body 28. A head 54 on output push rod 56 that surrounds reaction disc 58 is retained in annular groove 52. Head 54 communicates an output force developed through movement of the wall 22 by a pressure differential between chambers 18 and 20 to output rod 56 connected to pistons in a master cylinder. The development of the output force is controlled by a control valve 40 located in bore 30 that responds to an input force applied to push rod 50. The control valve 40 has a plunger 42 which is retained in bore 30 by a key member 44 of the type disclosed in U.S. Pat. No. 4,953,446 and a poppet member 48 which is retained in bore 30 by a retainer member 70. A valve return spring 72 caged between the retainer member 70 and shoulder 51 on push rod 50 urges the plunger 42 toward the poppet member 48 while a poppet spring 74 urges face 49 on poppet member 48 toward an annular atmospheric seat 43 on plunger 42.

The rear shell 14 is connected through a plurality of bolts 100,100' with bracket 102. The bracket 102 is affixed by bolts 104,104' to the dash panel 106 which separates the engine compartment from the passenger compartment of a vehicle. The bracket 102 off-sets the booster 10 from the dash panel 106 a distance sufficient to permit compact alignment with other components in the engine compartment while at the same time distributing any reaction forces over an wide area to minimize deflection forces.

A guard 108 has a cylindrical body 110 with a flange 109 on a first end 112 and a second end 114. The flange 109 which is located between shell 14 on brake booster 10 and bracket 102 extends into the passenger compartment. A tab 115 which extends from the peripheral surface of cylindrical body 110 is designed to maintain the cylindrical body 110 in axial alignment with bore 30 of hub 24. The interior of the cylindrical body 110 is divided by a partition wall 116 which has a central opening 118. The cylindrical body 110 has a radial opening 120 located at approximately the mid-point between the partition wall 116 and end 114 with the partition wall 116 which in turn being located at approximately the mid-point at between the radial opening 120 and end 112.

An end boot 122 has a first bead 124 located in a groove 126 on cylindrical body 110 and a second bead 128 which engages push rod 50 which connects pedal 134 with plunger 42. Push rod 50 which extends through central opening 118 in partition wall 116 and filter 134 retained in cylindrical body 110 has a spherical end 53 located in socket 41 on plunger 42 to compensate for any radial forces that may introduce radial loading on plunger 42. With end boot 122 secured to cylindrical body 110, a resonant chamber 142 is formed within the cylindrical body 110 which is segregated from the passenger compartment. The external surface of boot 122 which extends through opening 105 sealingly engages sound absorbing layer 107 on dash panel 106 in a manner to assure that the engine compartment is separated from the passenger compartment.

Mode of Operation of the Invention

The brake booster 10 is located in the engine compartment of a vehicle. Chamber 18 within brake booster 10 is connected to the intake manifold of an internal combustion engine through check valve 66. When the engine is operating, vacuum is produced at the intake manifold which evacuates air from chambers 18 and 20 and return spring within the brake booster 10 positions wall 22 in a rest position as shown in FIG. 1. When an operator desires to effect a brake application, an input force is applied to pedal which linearly moves push rod 50 causing plunger 42 to move away from atmospheric seat 49 on poppet member 48 and allow air to flow from the engine compartment into chamber 20 by way of passageway 38, through bore 30, central opening 118, resonant chamber 142 and radial opening 120. With air in chamber 20 and vacuum in chamber 18, a pressure differential corresponding to the input force is created. The pressure differential acts on wall 22 to develop an output force which after overcoming the return spring is communicated into the output push rod for moving pistons in the master cylinder to effect a brake application.

During a brake application, the flow of air from the engine compartment through radial opening 120 into resonant chamber 142 is unrestricted. However, the central opening 118 which forms an orifice which controls the flow air from the resonant chamber 142 into the valve body 28.

The size of the resonant chamber 142 is such that audible sounds produced by the flow of air to valve 40 for distribution to chamber 20 are dissipated. The size of the central opening 118 as shown in FIG. 2, can be adapted to different brake booster requirements and in certain situations may be modified through a plurality of openings 219,219', 220,220' which surround the central opening 118 such as illustrated in FIG. 3. The first group of plurality of openings 219,219' may be located at a first radial distance from an axial center of the central opening 118 while the second group 220,220' may be located at a second radial distance from the axial center of opening 118. In addition, the first group 219,219' and the second group 220,220' of openings may have a different diameter to assist in the control of the flow of air to chamber 18 and the attenuation of sound caused by such flow. It has been found that where the diameter A of radial opening 120 and the diameter B of the resonant chamber 142 have an approximate ration of 1:2.4 a reduction in noise occurs.

In order to confirm that the present invention provides for a reduction in audible sounds created through the flow of air to the valve body 28, a vehicle with a brake booster 10 having a guard having a resonant chamber 142 wherein air from the engine compartment is supplied to effect a brake application was compared with a standard brake booster wherein air from the passenger compartment is supplied to effect a brake application. The average sounds produced by brake booster 10 was 47.3 db whereas the average sounds produces by a standard booster was 52.5 db.

We claim:

1. A brake system having a brake booster secured to a dash panel which separates an engine compartment from a passenger compartment in a vehicle, said booster having a housing in which a valve body with a cylindrical projection extends through said housing and a valve located in said valve body is connected to an input rod, said valve being responsive to an input force from said input rod to selectively communicate air to a chamber for creating a pressure differential across a movable wall, said pressure differential acting on said movable wall to develop a corresponding output force to effect a brake application, said air on being communicated to said chamber producing audible sounds, said brake system being characterized by a guard for said valve body comprising a bracket for off-setting said booster from said dash panel into said engine compartment; a cylindrical body having a flange on a first end and a second end, said flange being located between said brake booster and said bracket, said cylindrical body having a partition wall with a central opening located between said first end and said second end and a radial opening located between said partition wall and said second end, said input rod extending through said central opening for supplying said valve with said input force; and an end boot secured to said second end of said cylindrical body and said input rod for forming a resonant chamber within said cylindrical body, said radial opening providing unrestricted communication air from the engine compartment to said resonant chamber while said central opening defines an orifice through which air flows from the resonant chamber into said valve body, said resonant chamber dissipating audible sounds produced by the flow of air through said orifice to said chamber.

2. The brake system as recited in claim 1 wherein said cylindrical body is further characterized by a peripheral groove located adjacent said second end for receiving a bead on said end boot.

3. The brake system as recited in claim 2 wherein said radial opening is located at approximately a mid-point between said partition wall and second end such that a minimum distance occurs between the entry of air into said resonant chamber and said orifice.

4. The brake system as recited in claim 3 wherein said partition wall is located at approximately a mid-point between said radial opening and said first end.

5. The brake system as recited in claim 4 wherein said guard is further characterized by a filter positioned adjacent said partition wall for removing any contamination that may be present in air being presented to said valve.

6. The brake system as recited in claim 5 wherein said cylindrical body is further characterized by an tab located in a peripheral surface and engaging said bracket for maintaining the cylindrical body in axial alignment with said valve body.

7. The brake system as recited in claim 1 wherein said partition wall is characterized by said central opening surrounded by a plurality of openings.

8. The brake system as recited in claim 7 wherein said plurality of openings include a first group located at a first radial distance from an axial center of said central opening and a second group located at a second radial distance from said axial opening.

9. The brake system as recited in claim 8 wherein said openings are of different diameters to provide for different rates of air flow to assist in the attenuation of audible noise.

10. The brake system as recited in claim 1 wherein said radial opening and resonant chamber have diameters in an approximate ratio of 1:2.4, sounds generated by the flow of air from the resonant chamber toward said valve are attenuated.

11. A brake system having a brake booster secured to a dash panel which separates an engine compartment from a passenger compartment in a vehicle, said booster having a housing in which a valve body with a cylindrical projection extends through said housing and a valve located in said valve body is connected to an input rod, said valve being responsive to an input force from said input rod to selectively communicate air to a chamber for creating a pressure differential across a movable wall, said pressure differential acting on said movable wall to develop a corresponding output force to effect a brake application, said air on being communicated to said chamber producing audible sounds, said brake system being characterized by a guard for said valve body comprising a cylindrical body having a flange on a first end and a second end, said flange being located between said brake booster and said dash panel, said cylindrical body having a partition wall with a central opening located between said first end and said second end and a radial opening located between said partition wall and said second end, said input rod extending through said central opening for supplying said valve with said input force; and an end boot secured to said second end of said cylindrical body and said input rod for forming a resonant chamber within said cylindrical body, said radial opening providing unrestricted communication air from the engine compartment to said resonant chamber while said central opening defines an orifice through which air flows from the resonant chamber into said valve body, said resonant chamber dissipating audible sounds produced by the flow of air through said orifice to said chamber.

* * * * *